US007039096B2

(12) United States Patent
Han

(10) Patent No.: US 7,039,096 B2
(45) Date of Patent: May 2, 2006

(54) METHOD AND SYSTEM FOR RESOURCE SHARING BETWEEN DEMODULATING PATHS OF A RAKE RECEIVER

(75) Inventor: Sung-Chul Han, Suwon-shi (KR)

(73) Assignee: Samsung Electronics Co., Ltd., (KR)

( * ) Notice: Subject to any disclaimer, the term of this patent is extended or adjusted under 35 U.S.C. 154(b) by 794 days.

(21) Appl. No.: 09/991,514

(22) Filed: Nov. 16, 2001

(65) Prior Publication Data
US 2003/0103556 A1   Jun. 5, 2003

(51) Int. Cl.
*H04B 1/69* (2006.01)
*H04B 1/10* (2006.01)
(52) U.S. Cl. ...................... 375/148; 375/349
(58) Field of Classification Search ........... 375/148, 375/130, 340, 347, 147, 149, 349; 370/203, 370/208; 455/3.2, 65
See application file for complete search history.

(56) References Cited

U.S. PATENT DOCUMENTS

| 5,490,165 A | * | 2/1996 | Blakeney et al. ........... 370/335 |
| 5,703,902 A | * | 12/1997 | Ziv et al. ..................... 375/228 |
| 6,154,487 A | * | 11/2000 | Murai et al. ................ 375/150 |

* cited by examiner

*Primary Examiner*—Khai Tran
(74) *Attorney, Agent, or Firm*—Dilworth & Barrese LLP

(57) ABSTRACT

A rake receiver for high data rate communications systems is provided that is able to share resources between demodulating branches without using independent hardware resources for each finger. The rake receiver of the present invention uses less circuitry while keeping functional equivalence, and it requires relatively smaller additional area when increasing the number of demodulating branches, thereby having a significantly smaller size, being able to track more demodulating paths for increasing performance, and being less complex as compared to conventional rake receivers for high data rate communications systems.

19 Claims, 8 Drawing Sheets

FIG. 7
700
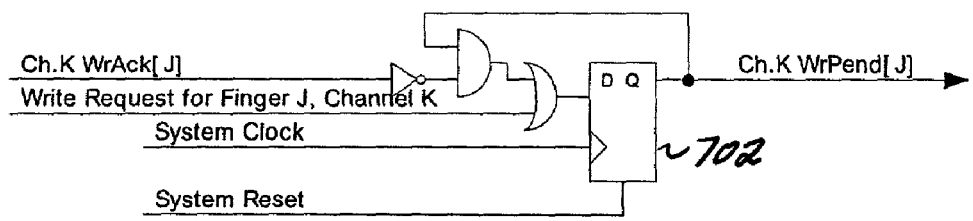
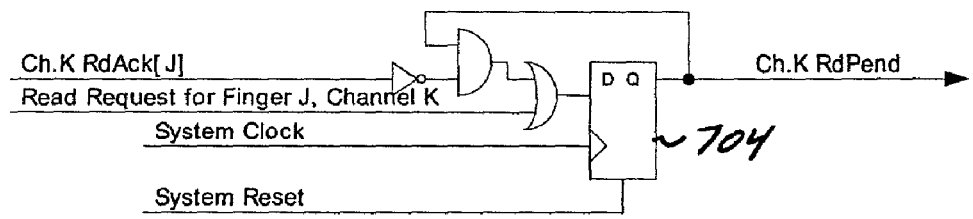
where K = 1,2,...,M,  J = 1,2,...,N
FIG. 8
Pending Status State Machine Behavior
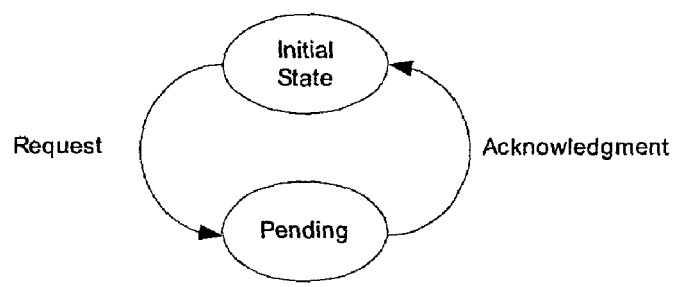

where K = 1,2,...,M,  J = 1,2,...,N

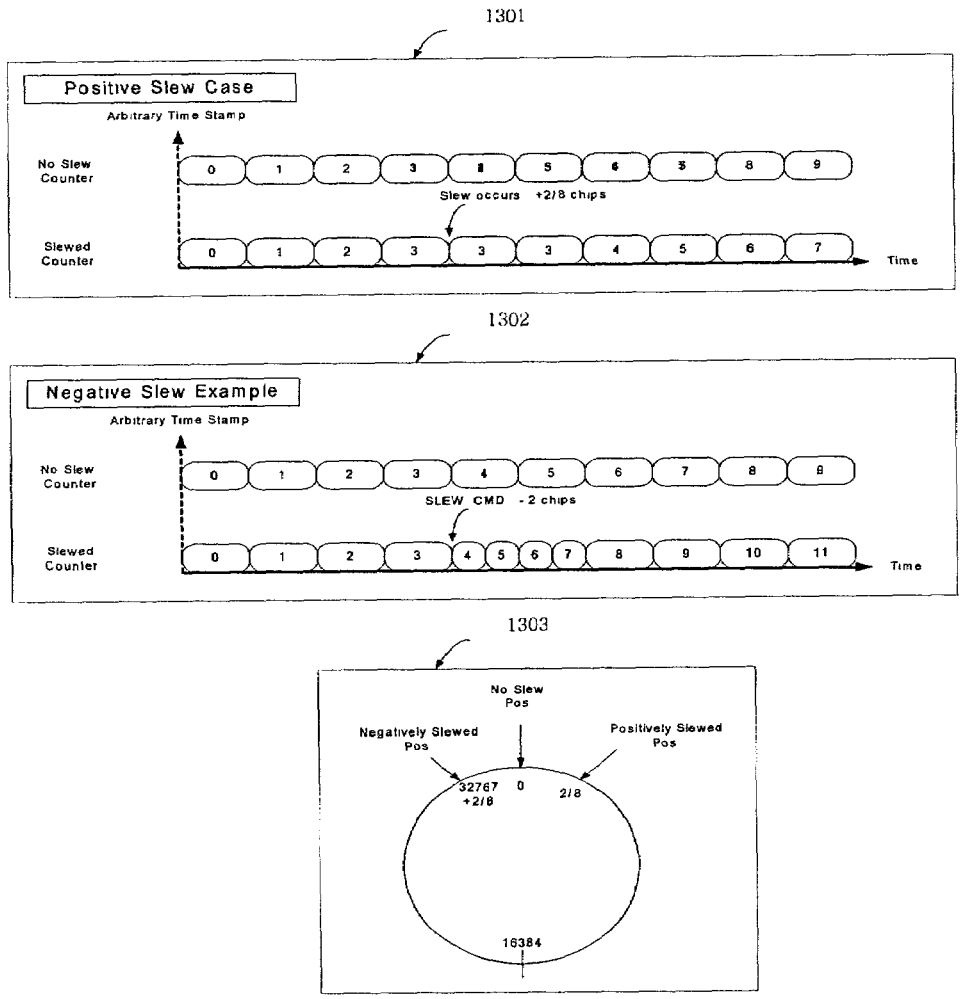
FIGS. 13A-C
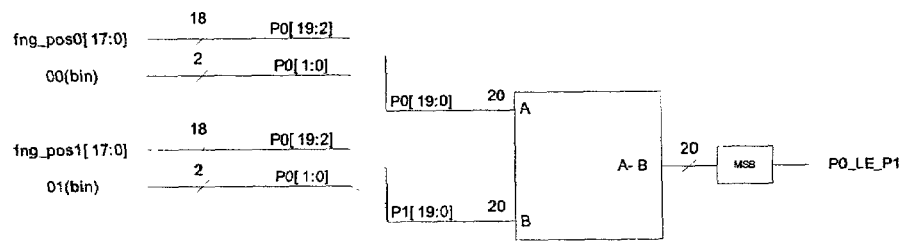
FIG. 14

METHOD AND SYSTEM FOR RESOURCE SHARING BETWEEN DEMODULATING PATHS OF A RAKE RECEIVER

BACKGROUND OF THE INVENTION

1. Technical Field

The present disclosure relates generally to mobile communications, and more particularly, to a method and system for resource sharing between demodulating paths of a rake receiver. In general, a rake receiver combines signals that are transmitted on a channel in different paths from a transmitter and arrive at different time points in order to increase reception performance through path diversity.

2. Background of the Related Art

As shown in FIGS. 1 and 2, a conventional rake receiver 100 includes an RF analog subsystem block 102, which converts signals received from an antenna 104 to digital data and feeds the converted digital data to each finger $106_1$–$106_N$. In each finger $106_1$–$106_N$, symbols transmitted from the transmitter are demodulated by PN despreading blocks $108_1$–$108_N$.

The demodulated symbols Wi and the estimated pilot channel gains Pi are provided by Walsh decovering blocks $110_1$–$110_N$ and pilot filter blocks $111_1$–$111_N$, and they are transferred to channel estimation and phase distortion compensation blocks $112_1$–$112_N$. The recovered symbols Si are stored in a kind of FIFO memory within time deskew buffers $114_1$–$114_N$ respectively. A symbol combiner 116 reads the symbols from the time deskew buffers $114_1$–$114_N$ (four time deskew buffers are shown in FIG. 2) of the fingers at the same time, combines them, and sends the symbols to a long code descrambler 118 for combining the symbols with a long code. A power-bit extractor 120 is connected to each time deskew buffer $114_1$–$114_N$ and to the symbol combiner 116.

In FIG. 2, reference characters A, B, C and D denote symbol data stored in time deskew buffers $114_1$, $114_2$, $114_3$, and $114_N$ of the rake receiver 100. The symbols are numbered to represent their sequence numbers. The pluralities of demodulating fingers $106_1$–$106_N$ operate in the same manner to demodulate signals with different arrival times. Therefore, the hardware of each finger $106_1$–$106_N$ has the same structure.

Each demodulating finger $106_1$–$106_N$ in the rake receiver 100 demodulates the symbols independently in a temporal sense, and stores the demodulated symbols in the time deskew buffers $114_1$–$114_N$. That is, since symbol combination can be performed by the symbol combiner 116 only after demodulation of the symbols of each finger $106_1$–$106_N$, the time deskew buffers $114_1$–$114_N$ store previously demodulated symbols until a symbol from the last branch is demodulated. Finally, all the symbols stored in the time deskew buffers $114_1$–$114_N$ are combined in the symbol combiner 116. In order to enable each finger to operate in its own timing reference, an independent time deskew buffer with the same size as the time deskew buffers $114_1$–$114_N$ is provided for each finger $106_1$–$106_N$.

For example, the required size of a time deskew buffer for one of RC3, 4 and 5 modes of a CDMA2000 system is (FCH_FIFO_DEPTH+SCH_FIFO_DEPTH+DCCH_FIFO_DEPTH+PILOT_ENERGY_FIFO_DEPTH)× DATA_WIDTH×number of fingers. Thus, the depth of the FIFO memory for storing data is increased and the architecture or structure of the rake receiver for third high data rate communications systems becomes complex.

In third generation systems, such as CDMA2000 and UMTS, or other high data rate communications systems, the required depths of the FIFOs are remarkably increased since more symbols are to be stored for higher data rate. In addition, the number of fingers is increased since more fingers are necessary to facilitate soft hand-offs and enhance multi-path diversity effects. The fact that an independent time deskew buffer of the same size as the time deskew buffers $114_1$–$114_N$ must be provided for each finger $106_1$–$106_N$, thereby causes an increase in the size of the FIFO memory, or time deskew buffers $114_1$–$114_N$, in proportion to the number of fingers $106_1$–$106_N$. Hence, there is an increase in the size and complexity of the rake receiver.

Accordingly, a need exists for a rake receiver for high data rate communications systems that is able to share resources between demodulating branches without using independent hardware resources, i.e., such as an independent time deskew buffer of the same size as the time deskew buffers $114_1$–$114_N$ for each finger $106_1$–$106_N$, to thereby reduce the area and complexity of the rake receiver.

SUMMARY OF THE INVENTION

The present invention provides a rake receiver for high data rate communications systems that is able to share resources between demodulating branches without using independent hardware resources for each finger. That is, the rake receiver of the present invention uses less circuitry while increasing the number of demodulating branches, thereby having a significantly smaller size, being able to track more demodulating paths for increasing performance, and being less complex as compared to conventional rake receivers for high data rate communications systems.

The rake receiver of a first embodiment according to the present invention includes a plurality of demodulating paths for demodulating symbols, a memory storage block for storing corresponding demodulated symbols from each of the plurality of demodulating paths; and storage control circuitry connected to each of the plurality of demodulating paths for receiving the demodulated symbols and for controlling the storage of the demodulated symbols within the memory storage block.

The rake receiver of a second embodiment according to the present invention includes a plurality of demodulating paths for demodulating symbols; storage control circuitry connected to each of the plurality of demodulating paths for receiving the demodulated symbols; a phase compensator connected to the storage control circuitry for receiving the demodulated symbols corresponding to each of the plurality of demodulating paths and for phase-compensating the demodulated symbols; and a memory storage block for receiving the phase compensated, demodulated symbols corresponding to each of the plurality of demodulating paths and for storing the demodulated symbols in accordance to signals received from the storage control circuitry.

BRIEF DESCRIPTION OF THE DRAWINGS

The invention is farther explained by way of example and with reference to the accompanying drawings, wherein:

FIG. 7 is a logic block diagram of a pending status state machine block of the priority decision logic block of FIG. 6;

FIG. 8 is a diagram illustrating operation of the pending status state machine block of the priority decision logic block of FIG. 6;

FIGS. 13A–C illustrate temporal representations of finger/searcher positions;

FIG. 14 is a schematic diagram of a two-finger position comparator;

DETAILED DESCRIPTION OF PREFERRED EMBODIMENTS

The present invention provides a rake receiver for high data rate communications systems that is able to share resources between demodulating branches without using independent hardware resources for each finger. That is, the rake receiver of the present invention uses less circuitry while increasing the number of demodulating branches, thereby having a significantly smaller size, being able to track more paths for increasing performance, and being less complex as compared to conventional rake receivers for high data rate communications systems.

Figure 1:
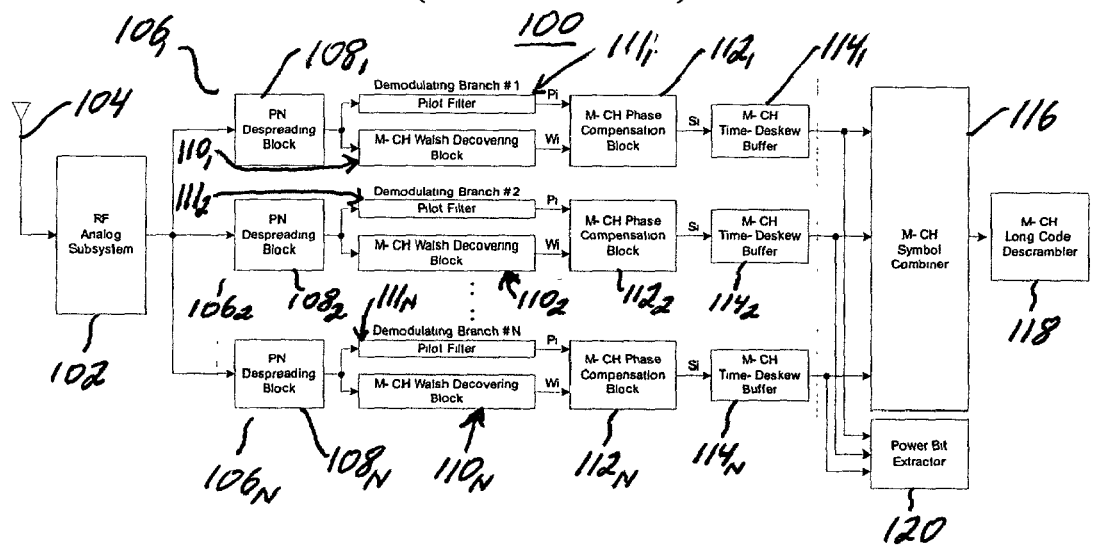
FIG. 1 is block diagram of a prior art rake receiver.
Figure 2:
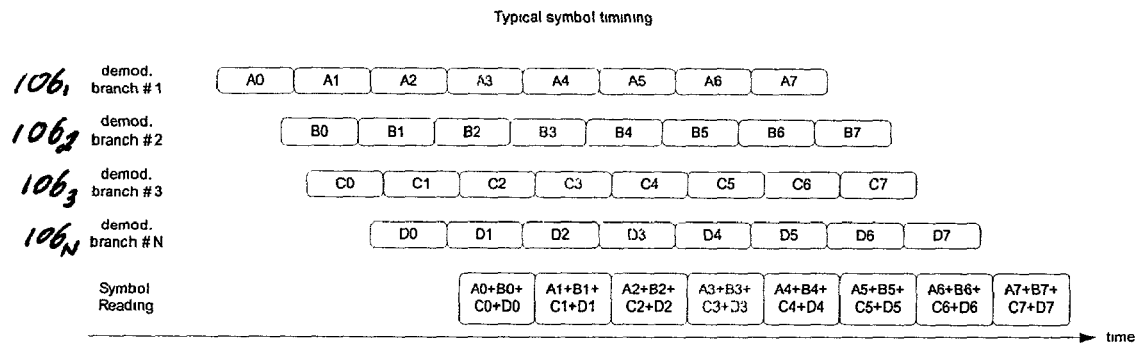
FIG. 2 is a diagram illustrating symbol combining timing in the prior art rake receiver shown by FIG. 1.

In a first embodiment of the inventive rake receiver sharing structure, time deskew buffers are shared between demodulating branches. In a second embodiment of the inventive rake receiver sharing structure, time deskew buffers and a phase compensator are shared between demodulating branches. In the first embodiment, the memory area required to implement the FIFO is decreased to approximately 1/(number of demodulating branches) as compared to a typical prior art rake receiver; for example, the rake receiver shown by FIG. 1. While in the second embodiment, the size of the inventive rake receiver is further decreased, because the logic area required to implement the phase compensator is decreased to 1/(number of demodulating branches) and a memory controller used for controlling sharing of the time deskew buffers is also used for controlling sharing of the phase compensator.

First Embodiment

Figure 3:
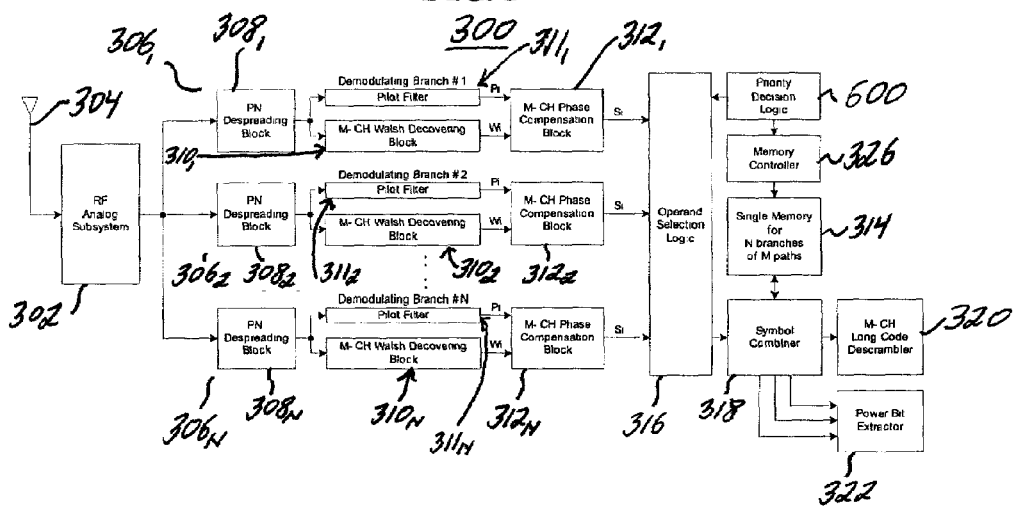
FIG. 3 is a block diagram of a rake receiver having a time deskew buffer sharing architecture according to a first embodiment of the present invention.

With reference to FIG. 3, there is shown a rake receiver according to the first embodiment designated generally by reference numeral 300. The rake receiver 300 includes an RF analog subsystem block 302, which converts signals received from an antenna 304 to digital data and feeds the converted digital data to each finger $306_1$–$306_N$. In each finger $306_1$–$306_N$, symbols transmitted from the transmitter are despreaded by PN despreading blocks $308_1$–$308_N$.

The demodulated symbols Wi and the estimated pilot channel gains Pi are provided by Walsh decovering blocks $310_1$–$310_N$ and pilot filter blocks $311_1$–$311_N$ respectively, and they are transferred to phase compensation blocks $312_1$–$312_N$. Therefore, the final output of each demodulating finger $306_1$–$306_N$ is phase-compensated symbol data. The symbol data belong to different physical channels and the data rate of each channel is variable according to circumstances. In the physical channels, each channel is identified by corresponding Walsh code or OVSF code on a radio link. Here, a CDMA2000 system is provided as an example.

The types and number of physical channels vary according to RC (Radio Configuration) in the CDMA2000 system. If RC is one of 3, 4 and 5, the physical channels are an FCH (Fundamental Channel) for transmission of a voice signal, an SCH (Supplemental Channel) for transmission of data, a DCCH (Dedicated Control Channel) for transmission of a control signal, Pilot Channel Energy for forward power control, and Power Control Subchannels 1, 2 and 3 for reverse power control. If RC is one of 1 and 2, the physical channels are FCH, SCHs 1 to 7, and Power Control Subchannels 1, 2, and 3.

The phase-compensated symbols Si outputted by the phase compensation blocks $312_1$–$312_N$ are also transmitted to and stored in a common time deskew buffer block 314 (Single Memory for N branches of M channel paths). The symbols Si are transmitted to the common time deskew buffer block 314 via operand selection logic block 316 and a symbol combiner 318. Accordingly, demodulated symbols corresponding to each finger $306_1$–$306_N$ are stored in the common time deskew buffer block 314. That is, the common time deskew buffer block 314 is shared by all the fingers $306_1$–$306_N$.

Since the common time deskew buffer block 314 is supposed to be implemented with a single-port memory for the best area efficiency, only one read or write operation can be performed at a particular time. Accordingly, the operand selection logic block 316 of the rake receiver 300 does not allow two or more data write requests entailing writing data to the buffer block 314 to be performed at the same time. Thus, when a write request signal in each channel of each branch is generated, the corresponding symbol is not stored immediately. Instead, it is suspended until the write request is acknowledged. In the same manner, a read request is suspended until it is acknowledged. Since the timing of each finger and a combiner is independent with one another, two or more write or read requests can occur at the same time. There is a need for arbitration to appropriately select one of the write or read requests to determine which one to process first.

For this purpose, priority decision logic block 600 is provided for determining the signal of the highest priority among the write or read requests that are pending, and the operands from the selected request are handled by the operand selection logic block 316. A detailed description of the functions and operation of the priority decision logic block 600 is provided below with reference to FIGS. 6–10.

A memory controller 326 determines which actions to take according to the type of operation, which is read or write, of the selected request. When the selected request is a write operation, the memory controller 326 further determines whether to directly store the symbol selected by the operand selection logic block 316 into the common time deskew buffer block 314 or to combine it with the symbol stored in the common time deskew buffer block 314 using the symbol combiner 318. The direct storage is chosen when the processed symbol is from the earliest demodulating path. Otherwise, the symbol combining with the stored symbol is chosen. For each of M channels, N symbols received by the N demodulating fingers are added in the order of receipt into the corresponding position in the common time deskew buffer block 314. This is described in more detail below.

Figure 4:
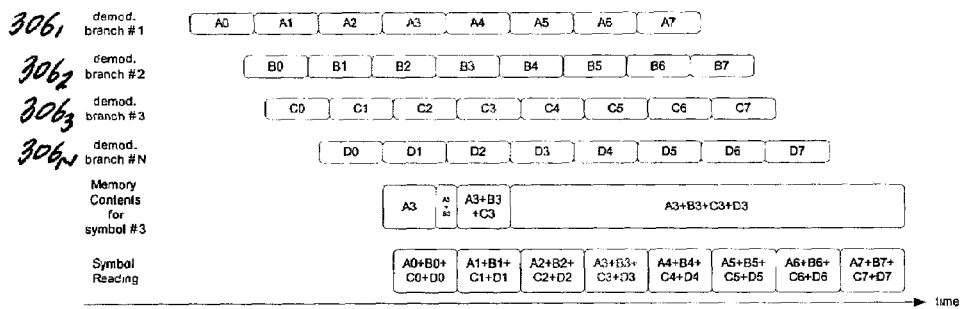
FIG. 4 is a diagram illustrating symbol combining timing when sharing the time deskew buffer sharing structure shown by FIG. 3.

After the symbols received by the N demodulating fingers are combined to generate a single result, the symbol combiner 318 reads the combined symbol from the common time deskew buffer block 314 (four symbol sequences corresponding to four fingers of the rake receiver 300 and the status of the memory contents within the common time deskew buffer block 314 where the $3^{rd}$ symbols corresponding to each finger are stored are shown in FIG. 4), and sends the combined symbol to a long code descrambler 320 for descrambling the symbol with a long code. The combined symbols are also sent to a power-bit extractor 322 for extracting the power bits.

In FIG. 4, with an assumption that the number of fingers N is 4, reference characters A, B, C and D denote symbol data corresponding to fingers $306_1$, $306_2$, $306_3$, and $306_N$, respectively. The symbols are numbered to represent their sequence numbers. The pluralities of demodulating fingers $306_1$–$306_N$ operate in the same manner to demodulate signals with different arrival times. The hardware of each finger $306_1$–$306_N$ has the same structure.

Symbols with same number are stored at the same position of the memory 314. In FIG. 4, memory contents for symbol #3 are shown, as an example. Upon receipt of a symbol A3 (A3 is the earliest received symbol from the series of demodulated symbols A3 to D3), it is written at a predetermined position of the memory 314 directly. Then, when a symbol B3 (B3 is the next symbol) is received, the symbol A3 is read from the memory 314, combined to the symbol B3, and re-written at the same position of the memory 314. Symbols C3 and D3 are also combined with the previous symbols in the same manner. Hence, after the symbol D3 is received, the value stored in the memory 314 is A3+B3+C3+D3. Accordingly, the Symbol Combiner 318 reads the value at a corresponding position of the memory 314, that is, A3+B3+C3+D3.

For the rake receiver 300, each branch demodulator, or finger $306_1$–$306_N$, transmits a write request signal to the memory controller 326 for sharing resources, before storing phase-compensated symbols in the common time deskew buffer 314. For example, if RC in the CDMA2000 system is one of 3, 4 and 5 and the CDMA2000 system has four fingers, seven physical channels exist for each finger. Therefore, write requests are generated with variable timing from a total of 28 physical channels. On the other hand, read requests are generated with variable timing from a total of 7 physical channels. The priority decision logic block 600 senses each request from the fingers and the combiner, and the requests are serviced one-by-one according to priority.

That is, since the rake receiver 300 includes only one common memory 314 (Single Memory for N branches of M paths), a write request for a symbol from the earliest demodulating path is written in a predetermined area of the time deskew buffer 314. Then, other write requests for symbols from the succeeding demodulating paths are serviced by combining the symbol with the previously stored symbol, and the combined symbols are stored in the same area of the time deskew buffer 314. This operation is repeatedly performed until a write request for a symbol from the last demodulating path is completely processed. Therefore, when symbol combining of the last demodulating path is completed, the symbols from all paths have been properly combined and stored in a specific area of the common time deskew buffer 314.

Hence, it first must be determined before writing a present symbol in the time deskew buffer 314 of the resource sharing rake receiver structure 300 according to the present invention, whether the present symbol belongs to the earliest demodulating path or finger. The determination is made by comparing the positions of the fingers in the embodiment of the present invention. The position of a particular finger refers to a timing difference of the PN sequence generator of the searcher and each finger from the initial value "0".

The PN sequence generators of the searcher and each finger are initiatialized to "0" at an arbitrary time in order to detect the relative temporal difference between the PN sequence generator of the searcher and a corresponding finger of the rake receiver 300. In the CDMA2000 system, the position range is the period of a short PN sequence, approximately 26.67 ms, i.e., 32768 PN chips, and the resolution is ⅛ chip. Therefore 18 bits are used to represent the position of a finger or searcher.

For ease of explanation, assume that there is an imaginary PN generator that runs regularly after initialization. The operation in which the PN sequence generator of a finger or a searcher runs faster or slower than the imaginary PN generator is called slew operation. The relative temporal difference of slewed fingers is shown by FIGS. 13A–C. Since the period of short PN code is 32768 chips, the positions of PN generators can be represented in a circle. The imaginary PN generator is never slewed, thus its position is fixed at 0. The position of a PN generator running slower than the imaginary PN generator is plotted with positive angle in clockwise sense in FIGS. 13A and 13C. On the other hand, the position of a PN generator running faster than the imaginary PN generator is plotted with negative angle in clockwise sense in FIGS. 13B and 13C. Comparing the positions of two fingers can be accomplished by subtracting the position of a finger from that of the other one.

If two or more fingers are at the same position, then to determine the earliest finger, or demodulating path, the fingers are numbered with 00(bin), 01(bin), 10(bin) and 11(bin) to the 18-bit positions of ⅛ PN chip units. Therefore, the relative sequence of each finger can be determined by subtraction between 20-bit positions.

Circuitry which compares the positions of two fingers is shown by FIG. 14. Two 20-bit positions, P0 and P1, are formed by concatenating 18-bit positions of finger 0 and 1 with their corresponding tail bits 00(bin) and 01(bin). When P1 is subtracted from P0, the MSB (Most Significant Bit) of the 20-bit result, P0_LE_P1, designates which position is earlier than the other. If P0 is 0 degrees to positive 180 degrees apart from P1, P0_LE_P1 becomes 0, which means finger 1 is earlier than finger 0. If P0 is 0 degrees to negative 180 degrees apart from P1, P0_LE_P1 becomes 1, which means finger 0 is earlier than finger 1. It is ambiguous to determine an earlier one when two fingers are 180 degrees apart, but such situation is impossible since there is a physical time limit between the arrival of multipath components, which means the fingers are never deployed far from one another.

Figure 15:
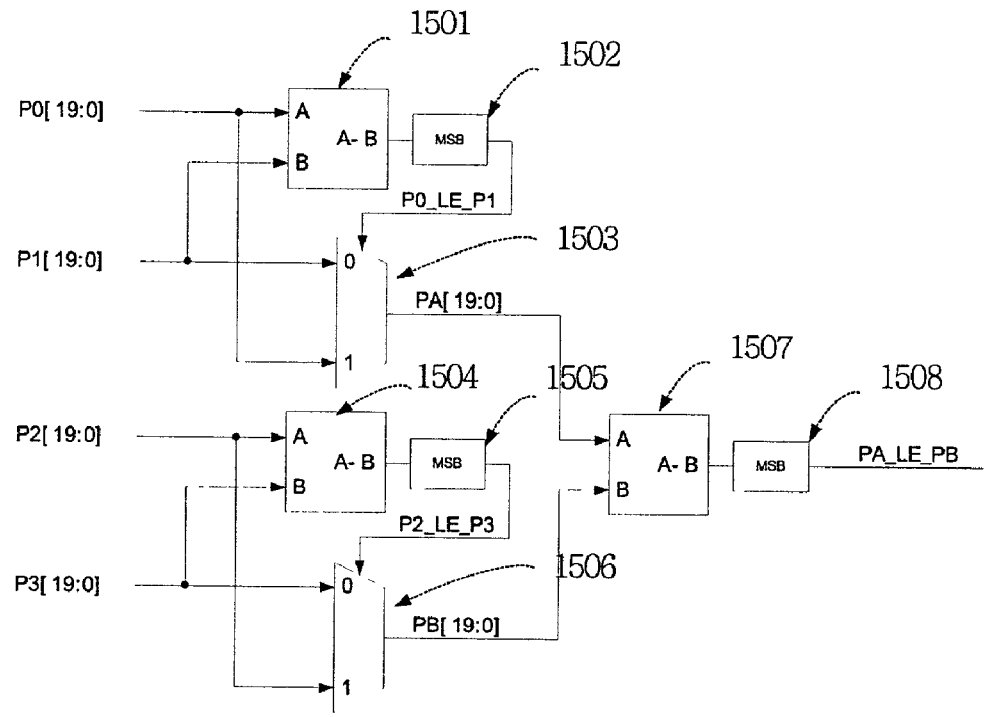
FIG. 15 is a schematic diagram of a four-finger position comparator.

Extending the function of the two-finger position comparator in FIG. 14, the earliest finger can be determined by comparing each finger pair after comparing finger pairs independently, if four fingers are given. A circuitry to compare the positions of 4 fingers is shown by FIG. 15. In the four finger comparators, earlier of P0 and P1 are determined using the subtractor 1501 and the MSB selector 1502. And then, the earlier of the two positions, represented as PA, is selected with the multiplexer 1503 using the result P0_LE_P1. In the same manner, the earlier one of P2 and P3, represented as PB, is also selected using the subtractor 1504, the MSB selector 1505, and the multiplexer 1506. Finally, whether PA is earlier than PB or vice versa is determined using the subtractor 1507 and the MSB selector 1508. Inspecting PA_LE_PB, P0_LE_P1, and P2_LE_P3 reveals which finger is the earliest one by applying a simple rule. If PA_LE_PB is 1, either P0 or P1 is the earliest, the earliest of which is further determined by P0_LE_P1. If PA_LE_PB is 0, either P2 or P3 is the earliest, the earliest of which is further determined by P2_LE_P3.

Figure 16:
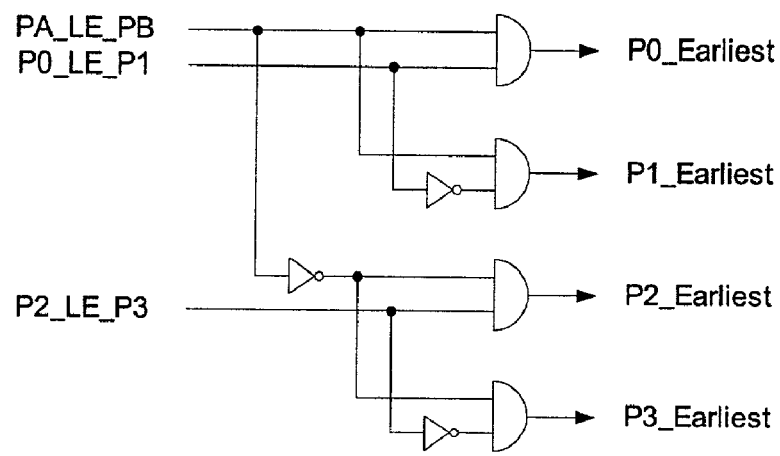
FIG. 16 is a logic diagram of earliest finger decision logic circuitry.

Circuitry which does this decision is shown by FIG. 16. Only one of the four outputs of the circuit is 1, and the output with value 1 designates the earliest finger. Accordingly, when a write request is generated, the memory controller 326 determines whether to write directly a symbol to the common time deskew buffer 314, or to combine the symbol with a previous symbol and then write the combined symbol to the common time deskew buffer 314 according to whether the finger which generated the write request is the earliest one.

Since corresponding signals from all demodulating paths are combined and stored at the same position or area of the memory 314, the capacity requirement of the memory 314 is significantly reduced. For example, the size of a deskew buffer required at one of the RC3, 4 and 5 modes in the CDMA2000 system using the inventive rake receiver 300 is (FCH_FIFO_DEPTH+SCH_FIFO_DEPTH+DCCH__FIFO_DEPTH+PILOT_ENERGY_FIFO_DEPTH+PWR__SUBCHANNEL_DEPTH×3)×(DATA_WIDTH+GUARD_BIT_WIDTH).

GUARD_BIT_WIDTH is $\log_2$(number of fingers) parameter used to store a carry generated during symbol combining. Though this guard bit makes the memory required for the resource sharing structure larger than the memory required for one finger of a prior art, the increased memory capacity requirement is negligible. Further, the memory requirement is reduced by 75% in a four-finger system using the inventive rake receiver sharing structure 300.

Additionally, since PWR_SUBCHANNEL_DEPTH, a space necessary to separately store power control symbols for each cell and combine them, as described below, is much smaller than SCH_FIFO_DEPTH used in conventional rake receivers, its contribution to the memory capacity requirement increase is also negligible. Also, in the inventive rake receiver 300, at the RC1 or 2 modes, up to seven SCCHs are used instead of a single SCH used at the RC3, RC4, or RC5 modes. The portion of memory used for SCH is large enough to accommodate seven SCCHs. Accordingly, the memory capacity for the SCH is evenly divided and assigned to SCCH #1 to #7 without the need of additional memory capacity at the RC1 or 2 modes.

While conventional rake receiver structures combine the symbols belonging to different physical channels in parallel according to the corresponding symbol boundary generated by an internal RTG (Reference Timing Generator), the resource sharing rake receiver structure 300 according to the first embodiment of the present invention transmits a read request to the memory controller 326 according to the RTG timing. That is, if RC is 3, 4, or 5, read requests are generated with variable timing from seven physical channels and the memory controller 326 processes each read request from the physical channels one-by-one according to a priority scheme. The write requests are processed in the same manner by the memory controller 326. Accordingly, even if a write request and a read request are generated simultaneously, one of the requests is processed first according to the priority scheme. That is, the time deskew memory 314 is not implemented with a dual port memory that enables simultaneous writing and reading, but with a single port memory.

Symbol combining will now be described in the case of power control symbols. While symbols from all paths are simply summed for symbol combining by the inventive rake receiver 300, power control symbols are grouped according to corresponding cells before they are combined.

In a conventional rake receiver, it is possible to distinguish which cell a certain symbol is transmitted from after the deskew operation, because symbols from individual paths are separately stored in the corresponding deskewer. But since all symbols are combined in the writing step in the resource sharing rake receiver structure 300 of the present invention, power control symbols belonging to each cell are considered separately from the other symbols. In other words, a separate physical channel is required for storing the power control symbols of each cell. In an exemplary embodiment of the present invention, three cells are supported and PWR_SUBCHANNELs 1, 2 and 3 separately combine symbols belonging to cells #1, 2 and 3.

Second Embodiment

Figure 5:
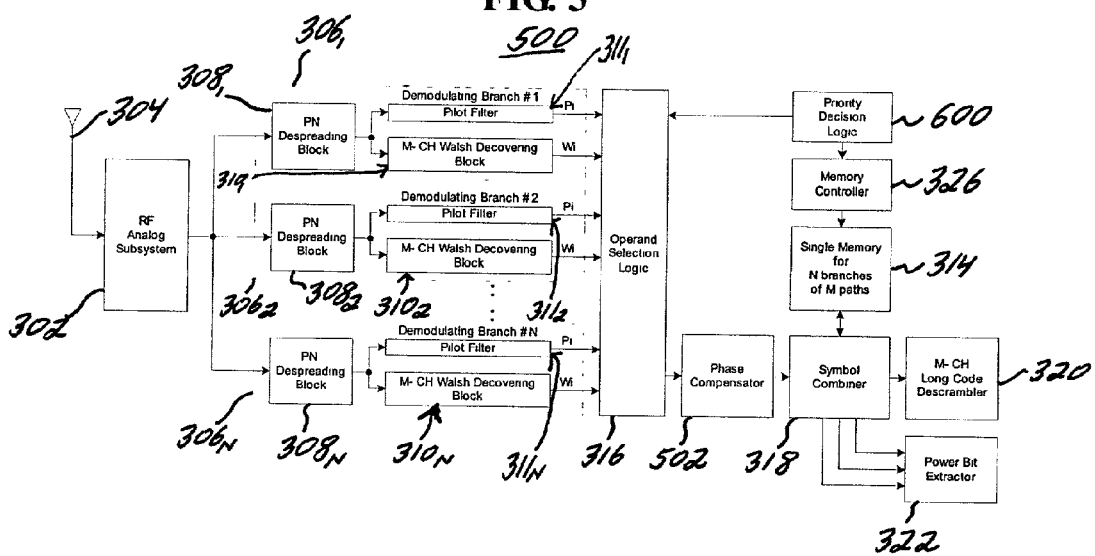
FIG. 5 is a block diagram of a rake receiver having a time deskew buffer and phase compensator sharing architecture according to a second embodiment of the present invention.

With reference to FIG. 5, there is shown a rake receiver structure according to the second embodiment designated generally by reference numeral 500. The rake receiver structure 500 includes the RF analog subsystem block 302, which converts signals received from the antenna 304 to digital data and feeds the converted digital data to each finger $306_1$–$306_N$. In each finger $306_1$$306_N$, symbols transmitted from the transmitter are despreaded by the PN despreading blocks $308_1$–$308_N$. The demodulated symbols Wi and the estimated pilot channel gains Pi are provided by Walsh decovering blocks $310_1$–$310_N$ and pilot filter blocks $311_1$–$311_N$, and they are transferred to the operand selection logic block 316. The output of each finger $306_1$–$306_N$ is not a symbol but a correlator output for each channel and an estimated pilot channel gain.

In the same manner as for the case of sharing only the time deskew buffer 314 of the first embodiment, the priority decision logic block 600 selects one of the requests that have not been processed and receives an operand corresponding to the selected request. A phase compensator 502 multiplies a correlator output selected by the operand selection logic block 316 by the complex conjugate of the channel estimation value for performing phase compensation. That is, the phase compensator 502 multiplies the output of the correlator for the selected channel in the selected finger by the output of a Pilot Filter (channel estimator filter) in the selected finger.

The memory controller 326 determines whether to write a current symbol directly in the memory 314 or to combine the current symbol with the previously stored symbol before writing in the memory 314 according to whether the present write request belongs to the earliest demodulating path, similar to the case of sharing only the time deskew buffer 314 as in the first embodiment. That is, each finger $306_1$–$306_N$ transmits a write request signal to the priority decision logic 600 after correlation. Upon receiving the write request signal, the priority decision logic 600 reads the previously stored symbol from the time deskew buffer 314 and controls the phase compensator 502 to perform complex multiplication of the current symbol. Then, the memory controller 326 combines the read symbol with the complex multiplication result and stores the combined result at the same position of the common time deskew buffer 314.

The phase compensator 502 (or complex multiplier) includes two MAC (Multiply and Accumulate) units. In this case, two clocks are taken for complex multiplication. In addition, two clocks are also taken to read a symbol from the memory 314, combining it with another symbol, and storing the combining result within the memory 314. These two steps are pipelined so that only two clocks are taken to process a write or read request as in the first embodiment.

Figure 6:
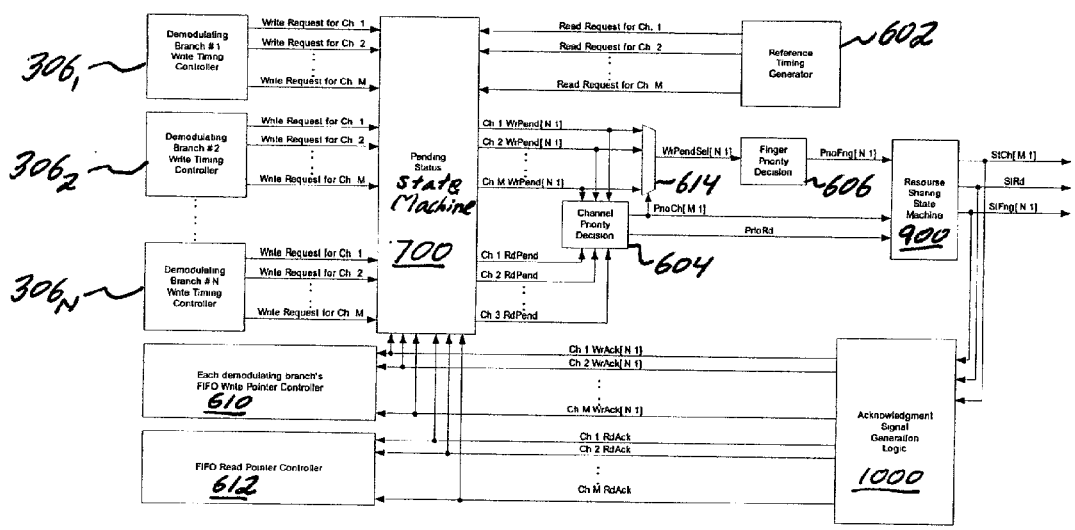
FIG. 6 is a block diagram of a priority decision logic block for use in the time deskew buffer and phase compensator sharing architecture according to the present invention.

FIG. 6 illustrates the overall structure of the priority decision logic block 600 for use in the resource sharing rake receiver structure 300 and 500. Write requests for each physical channel transmitted from the corresponding fingers $306_1$–$306_N$ and read requests for each physical channel transmitted from a FIFO read pointer of the RTG (Reference Timing Generator) 602 are registered in a pending status state machine 700. Here, request registration means transition of a corresponding WrPend (write pending) bit to 1 in case of a write request and transition of a corresponding RdPend (read pending) bit to 1 in case of a read request. Each write or read pending bit indicates that the corresponding write or read request was generated but has not yet been processed.

A channel priority decision logic block 604 and a finger priority decision logic block 606 select a channel and a finger, respectively, to be processed according to priority among the presently pending requests WrPend (write pending request) or RdPend (read pending request). Information about the selected channel and finger is fed to a resource sharing state machine block 900 for controlling the memory controller 326. The resource sharing state machine block 900 sends signals StCh (state channel), StRd (state read), and StFng (state finger) to the memory controller 326 and to an acknowledgment signal generation logic block 1000 which generates an acknowledge signal WrAck (write acknowledgment) or RdAck (read acknowledgment) for the processed request, transmits the acknowledge signal to the pending status state machine block 700 to notify that the corresponding request was processed completely, and also to FIFO write/read pointer controller blocks 610, 612 to increase the corresponding pointer value.

FIGS. 7 and 8 illustrate the structure and operation of the pending status state machine 700. In FIG. 7, the upper circuit is a write request processing circuit for a $K^{th}$ channel in a $J^{th}$ finger, and the lower circuit is a read request processing circuit for a $K^{th}$ channel in a $J^{th}$ finger.

When a write or read request is generated, the pending status state machine 700 changes a flip flop state of flip flop 702 or 704 into 1, notifying that a corresponding (write or read) request has been registered. When the process of the corresponding request (write or read) is completed, an acknowledge signal for the above request is generated and the flip flop state returns to 0. That is, once the flip flop state 1 is entered, the state is maintained until the acknowledgement signal is received for the corresponding request.

More particularly, the channel priority decision logic block 604 determines the sequence (i.e., order) of the channels to be processed among the pending bits of the state 1 according to a priority scheme, and outputs the selection result as a signal PrioCh (priority channel). The signal PrioCh selects a signal vector of the corresponding channel among signals WrPend using a multiplexer 614. The multiplexer 614 outputs a signal WrPendSel (write pending selection) for the corresponding channel.

Table 1 lists physical channel assignments in the CDMA2000 system, as an example. In the embodiment of the present invention, the SCH having the highest data rate is processed first by granting the highest priority to it. Otherwise, it is possible that the previous symbol is not completely processed until a new request for the next SCH symbol is received, which means the symbol combing cannot be properly performed.

TABLE 1

Physical channel assignments in the CDMA2000 system.

| Channel Number | Physical Channel |
|---|---|
| 1 | FCH |
| 2 | SCH or SCCH1 |
| 3 | DCCH |
| 4 | Pilot Energy |
| 5 | SCCH2, SCCH3 |
| 6 | SCCH4, SCCH5 |
| 7 | SCCH6, SCCH7 |
| 8 | Power Subchannel 1 |
| 9 | Power Subchannel 2 |
| 10 | Power subchannel 3 |

Symbols in each physical channel are complex, which means they are in the separated format in an I arm and a Q arm, but they should be multiplexed into one stream, and thus a symbol reading logic has a narrower timing margin than a symbol generating logic (i.e., reading logic has less idle time than writing logic). Hence, a higher priority is given to a read request than a write request as shown in Table 2. By the same manner, as most write requests are processed within the symbol periods of the channels; the SCH is processed with the highest priority because it has the shortest symbol period for SF (Spreading Factor) 4.

TABLE 2

An example of priority for channel selection

| Priority | Input Condition | Output PrioCh[10:1] | PrioRd | Channel Name & Access Type |
|---|---|---|---|---|
| 1 | Ch.2 RdPend = 1 | 'b0000000010 | 1 | SCH read |
| 2 | Ch.2 WrPend[N:1] ! = 1 | 'b0000000010 | 0 | SCH write |
| 3 | Ch.1 RdPend = 1 | 'b0000000001 | 1 | FCH Read |
| 4 | Ch.3 RdPend = 1 | 'b0000000100 | 1 | DCCH Read |
| 5 | Ch.4 RdPend = 1 | 'b0000001000 | 1 | SCCH2, SCCH3 Read |

TABLE 2-continued

An example of priority for channel selection

| Priority | Input Condition | Output PrioCh[10:1] | PrioRd | Channel Name & Access Type |
|---|---|---|---|---|
| 6 | Ch.5 RdPend = 1 | 'b0000010000 | 1 | SCCH4, SCCH5 Read |
| 7 | Ch.6 RdPend = 1 | 'b0000100000 | 1 | SCCH6, SCCH7 Read |
| 8 | Ch.7 RdPend = 1 | 'b0001000000 | 1 | Power Subchannel 1 Read |
| 9 | Ch.8 RdPend = 1 | 'b0010000000 | 1 | Power Subchannel 2 Read |
| 10 | Ch.9 RdPend = 1 | 'b0100000000 | 1 | Power Subchannel 3 Read |
| 11 | Ch.10 RdPend = 1 | 'b1000000000 | 1 | Pilot Energy Read |
| 12 | Ch.1 WrPend[N:1] ! = 1 | 'b0000000001 | 0 | FCH write |
| 13 | Ch.3 WrPend[N:1] ! = 1 | 'b0000000100 | 0 | DCCH write |
| 14 | Ch.4 WrPend[N:1] ! = 1 | 'b0000001000 | 0 | SCCH2, SCCH3 Write |
| 15 | Ch.5 WrPend[N:1] ! = 1 | 'b0000010000 | 0 | SCCH3, SCCH3 Write |
| 16 | Ch.6 WrPend[N:1] ! = 1 | 'b0000100000 | 0 | SCCH4, SCCH3 Write |
| 17 | Ch.7 WrPend[N:1] ! = 1 | 'b0001000000 | 0 | Power Subchannel 1 Write |
| 18 | Ch.8 WrPend[N:1] ! = 1 | 'b0010000000 | 0 | Power Subchannel 2 Write |
| 19 | Ch.9 WrPend[N:1] ! = 1 | 'b0100000000 | 0 | Power Subchannel 3 Write |
| 20 | Ch.10 WrPend[N:1] ! = 1 | 'b1000000000 | 0 | Pilot Energy Write |

In case write requests belonging to the same physical channels are generated simultaneously from two or more fingers, the finger priority decision logic block 606 can process the write requests in an arbitrary order because of the same timing margin in all fingers $306_1$–$306_N$. Table 3 shows an example of finger priority where fingers $306_1$–$306_N$ with lower numbers are processed first and "X" indicates "don't care". That is, Table 3 shows an example of priority decision when write requests for the same channel are generated simultaneously from the plurality of fingers $306_1$–$306_N$.

TABLE 3

An example of priority for finger selection.

| WrPendSel[4:1] | PrioFng[4:1] |
|---|---|
| 'bXXX1 | 'b0001 |
| 'bXX10 | 'b0010 |
| 'bX100 | 'b0100 |
| 'b1000 | 'b1000 |

Figure 9:
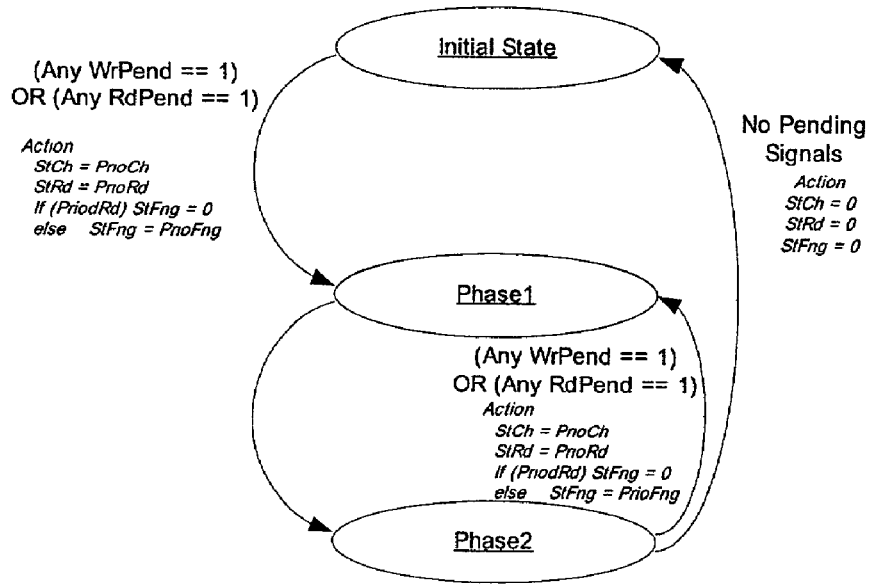
FIG. 9 is a diagram illustrating operation of the resource sharing state machine block of the priority decision logic block of FIG. 6.

FIG. 9 is a state transition diagram of the resource sharing state machine 900 for controlling timing to process each request at one time in the resources sharing rake receiver structure 500. The resource sharing state machine 900 generates a necessary timing by the channel priority decision logic block 604 and the finger priority decision logic block 606. If there is no request, the resource sharing state machine 900 remains at an initial state (i.e., any WrPend!=1 and any RdPend!=1). If at least one pending signal exists (i.e., any WrPend==1 or any RdPend==1), the resource sharing state machine 900 changes the initial state into phase1.

Here, the priority decision logic block 600 stores the presently selected channel, access type, and finger number in StCH, StRd, and StFng, respectively. Phase1 is automatically transitioned to phase2 after one system clock, because two system clocks are required to process each request. If there is a pending signal, phase2 is transitioned to phase1 like the initial state. If there is no pending signal at phase1, the resource sharing state machine 900 sets channels, fingers, and operations to initial values and returns to the initial state. Therefore, if there is a plurality of pending bits, one request is processed and then the next request is sequentially processed according to a system clock.

Figure 10:
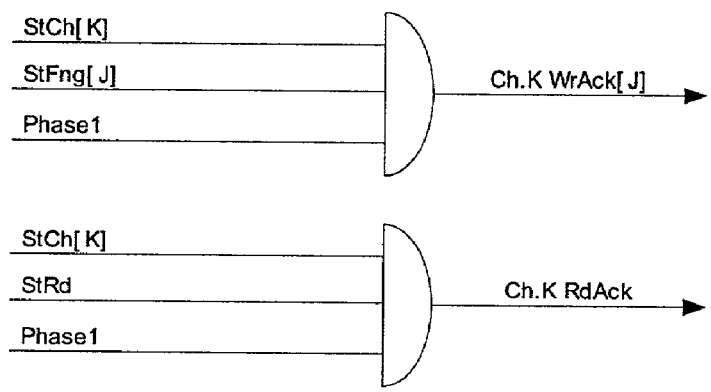
FIG. 10 is a logic block diagram of an acknowledgement signal generation logic block of the priority decision logic block of FIG. 6.

FIG. 10 illustrates the structure of the acknowledgement signal generation logic block 1000. Upon simultaneous generation of a channel number, a finger number, and a phase1 signal stored in the resource sharing state machine 900, the acknowledgement signal generation logic block 1000 generates acknowledgement signals (WrAck or RdAck) and transmits them to the corresponding pending status state machine 700, write pointer controller 610, and read pointer controller 612. Upon receipt of the acknowledgement signals, the pending status state machine 700 switches the corresponding pending bit into 0, and also the write pointer controller 610 and the read pointer controller 612 increase the write and read request pointers, respectively, of a corresponding channel in a corresponding finger by 1.

Figure 11:
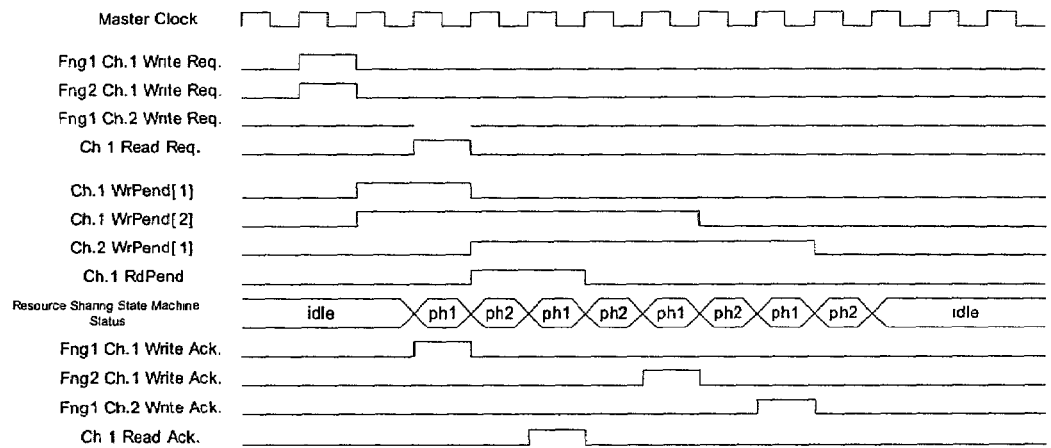
FIG. 11 illustrates timing diagrams for the first embodiment of the rake receiver architecture as shown by FIG. 3.

FIG. 11 illustrates the timing of the first embodiment of the present invention where only the common time deskew buffer 314 is shared in the case where 3 writing requests and 1 read request are generated. Once each request is generated, corresponding pending bits are switched into "1", and are restored "0" in case of receipt of an acknowledgement. Here, the corresponding channels for processing are selected according to the priority scheme. Though the read requests are generated after write requests, the read request is processed in advance because of its higher priority over the write requests according to the priority scheme.

Figure 12:
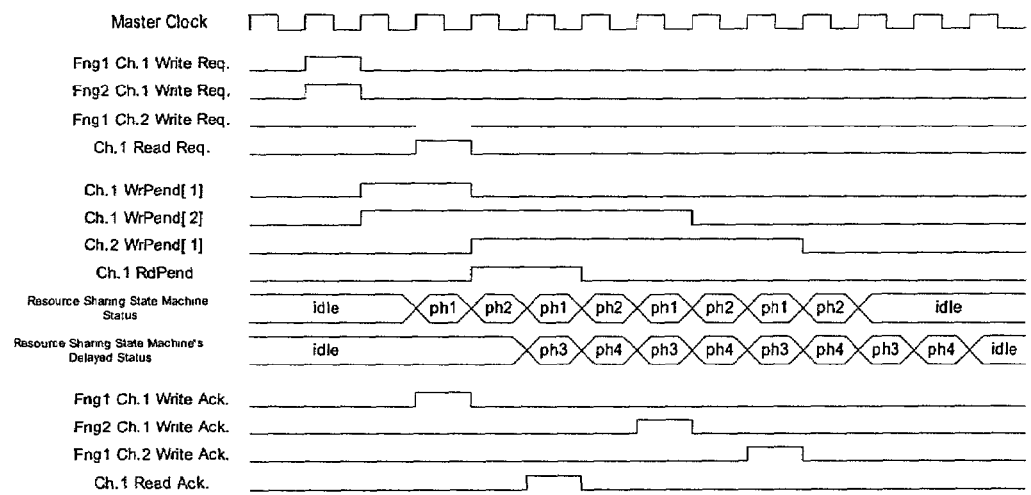
FIG. 12 illustrates timing diagrams for the second embodiment of the rake receiver architecture as shown by FIG. 5.

FIG. 12 illustrates the timing of the second embodiment of the present invention where the common time deskew buffer 314 and phase compensator 502 are shared in the case where 3 writing requests and 1 read request are generated.

In this case, phase3 is generated by 1 clock delay with respect to phase2 in the resource sharing state machine 900, and phase 4 is generated by 1 clock delay with respect to phase3. However, as the phase3 and phase4 are overlaid to the phase1 and phase2 of next request at temporal state, the required time for processing is able to keep two clocks. The operation of each phase in resource sharing state machine 900 according to the sharing mode is shown in Table 4.

logic one value indicates one of the pending write and read requests, respectively, to be processed.

3. The priority decision block according to claim 2, wherein the means for controlling the processing of pending write and read requests further includes a channel priority decision block and a demodulating path priority decision block for selecting a channel and a demodulating path from

TABLE 4

Operation according to the state of resource sharing state machine

| State of the Resource Sharing State Machine | | Share only Time Deskew Buffer | | Share both Time Deskew Buffer and Phase Compensator | |
| --- | --- | --- | --- | --- | --- |
| | | Write Request | Read Request | Write Request | Read Request |
| Phase 1 | Initial path | — | Read a stored symbol | Operation for phase compensation (1) | — |
| | Not initial path | Read a stored symbol | | | |
| Phase 2 | Initial path | Store new symbol | Output after Combining the stored symbol with scaling factor | Operation for phase compensation (2) | — |
| | Not initial path | Combine the stored symbol with new symbol | | | |
| Phase 3 | Initial path | — | — | — | Read a stored symbol |
| | Not initial path | | | Read a stored symbol | |
| Phase 4 | Initial path | — | — | Store new symbol | Output after Combining the stored symbol with scaling factor |
| | Not initial path | | | Combine the stored symbol with new symbol | |

It will be understood that various modifications may be made to the embodiments disclosed herein and that the above description should not be construed as limiting, but merely as exemplifications of preferred embodiments. Accordingly, those skilled in the art will envision other modifications within the scope and spirit of the claims appended hereto.

What is claimed is:

1. A priority decision block configured for a rake receiver, the priority decision block comprising:
    means for controlling the processing of pending write and read requests for storing demodulated symbols to and reading out demodulated symbols from a memory storage block; and
    means for sending at least one signal to a memory controller for controlling the storage and reading out of the demodulated symbols to and from the memory storage block in accordance with the processed pending write and read requests.

2. The priority decision block according to claim 1, wherein the means for controlling the processing of pending write and read requests includes a pending status state machine for receiving write request and read request signals and registering the same according to their order of generation by causing transition of a corresponding write pending or read pending bit, respectively, to a logic one value, and wherein each write pending and read pending bit having a a plurality of demodulating paths of the rake receiver, respectively, according to a priority scheme of the pending write and read requests.

3. The priority decision block according to claim 3, wherein the means for sending at least one signal to the memory controller includes a resource sharing state machine for receiving information about the selected channel and demodulating path and sending signals to at least the memory controller for processing the pending write and read requests, and controlling the memory storage block accordingly.

5. The priority decision block according to claim 4, wherein the means for controlling the processing of pending write and read requests includes an acknowledgment signal generation logic block for receiving the signals from the resource sharing state machine, generating at least one acknowledgment signal for at least the processed write and read requests corresponding to the pending write and read requests, and transmitting the at least one acknowledgment signal to the pending status state machine to indicate that the pending write and read requests have been processed, and wherein upon receipt of the at least one acknowledgment signal by the pending status state machine, the pending status state machine switches the corresponding write and/or read pending bits to a logic zero value.

6. The priority decision block according to claim 5, further comprising write and read pointer controller block for receiving the at least one acknowledgment signal for increasing at least one corresponding write request pointer and at least one corresponding read request pointer, respectively, for processing a subsequent pending write and pending read request of the pending write and read requests according to the priority scheme.

7. A rake receiver for demodulating a multipath signal, the rake receiver comprising:
- a plurality of fingers including a despreading block for despreading signals that are received after bandspreading and a compensator for compensating the despread signals;
- a storage block for storing symbols output from the plurality of fingers; and
- a combiner for performing one of directly storing a symbol output from a finger assigned to an earliest path, and for combining a symbol with a corresponding symbol stored in the storage block and then writing the combined symbols at the storage block.

8. The rake receiver according to claim 7, wherein the combiner stores a first symbol output from the finger assigned to the earliest path, reads out the first symbol upon receiving a second symbol output from a finger assigned to a next earliest path, combines the first symbol with the second symbol, and writes the combined symbol at a same position of the storage block.

9. The rake receiver according to claim 7, further comprising control circuitry connected to the storage block for controlling the reading out of the stored symbols.

10. A rake receiver for demodulating a multipath signal, the rake receiver comprising:
- an antenna for receiving the multipath signal;
- a digital conversion block for converting received analog signals to digital data;
- a plurality of fingers for despreading the digital data according to a predetermined time period;
- a compensator block for compensating symbols output from the plurality of fingers;
- a storage block for storing symbols output from the compensator; and
- a combiner for performing one of directly storing a symbol corresponding to an earliest path among symbols output from the compensator, and for combining a symbol output from the compensator with a corresponding symbol stored in the storage block and then writing the combined symbols at the storage block.

11. The rake receiver according to claim 10, wherein the combiner further comprises means for numbering each of the plurality of paths, if two or more paths are at the same position according to an arbitrary time period, for determining which of the two or more paths is the earliest path.

12. The rake receiver according to claim 10, wherein the compensator block connected to the storage block for receiving the despread symbols corresponding to each of the plurality of paths and for phase compensating the despread symbols prior to storing the despread symbols within the storage block.

13. The rake receiver according to claim 10, wherein the combiner performs a process in which the combiner directly stores a first symbol corresponding to the earliest path among symbols output from the compensator, reads out the first symbol upon receiving a second symbol corresponding to the next earliest path among symbols output from the compensator, combines the first symbol with the second symbol, writes the combined first and second symbols at the storage block, and repeats the process until a last symbol corresponding to the last path among symbols output from the compensator is received.

14. The rake receiver according to claim 13, wherein the combiner processes a read request signal and a write request signal according to a priority scheme, and wherein only one read or write request signal is processed at any given time according to the priority scheme.

15. The rake receiver according to claim 13, further comprising a priority decision block for determining a processing priority of a write request signals and sending at least one signal to the storage block indicative of the determined processing priority of the write request signals for storing symbols within the storage block.

16. A method of receiving data through a rake receiver including a plurality of fingers and a storage block, comprising the steps of:
- despreading a signal of an assigned path at a finger;
- compensating the despread signal; and
- performing one of directly storing a symbol output from a finger assigned to an earliest path, and for combining a symbol with a corresponding symbol stored in the storage block and then writing the combined symbols at the storage block.

17. The method as claimed in claim 16, wherein the step of storing the symbol output from the finger assigned to the earliest path comprises:
- storing a first symbol output from the finger assigned to the earliest path;
- reading out the first symbol upon receiving a second symbol output from a finger assigned to a next earliest path; combining the first symbol with the second symbol; and
- writing the combined symbol at a same position of the storage block.

18. The method as claimed in claim 16, wherein the despread signal is sequentially compensated from a signal corresponding to the earliest path to a signal corresponding to a last path.

19. The method as claimed in claim 16, wherein the despread signal is individually compensated for an assigned path to each finger.

* * * * *